March 31, 1959    G. J. BADGLEY    2,879,688
TELEVISION RECORDING CAMERA HAVING STABILIZED SHUTTER
Filed Dec. 30, 1953      4 Sheets-Sheet 1
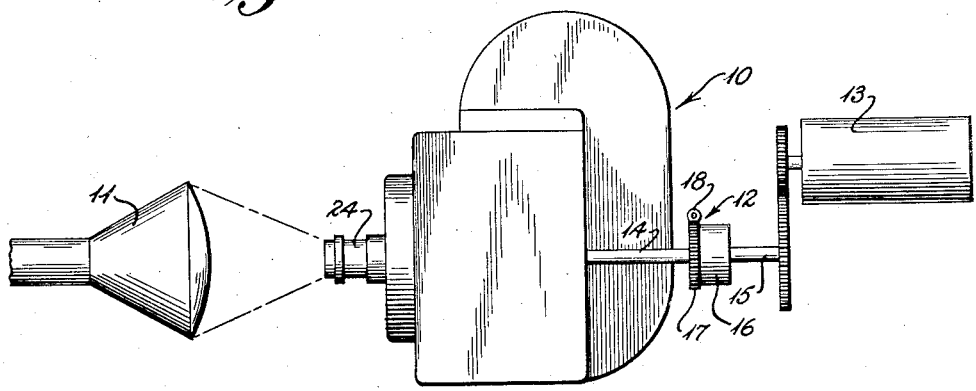
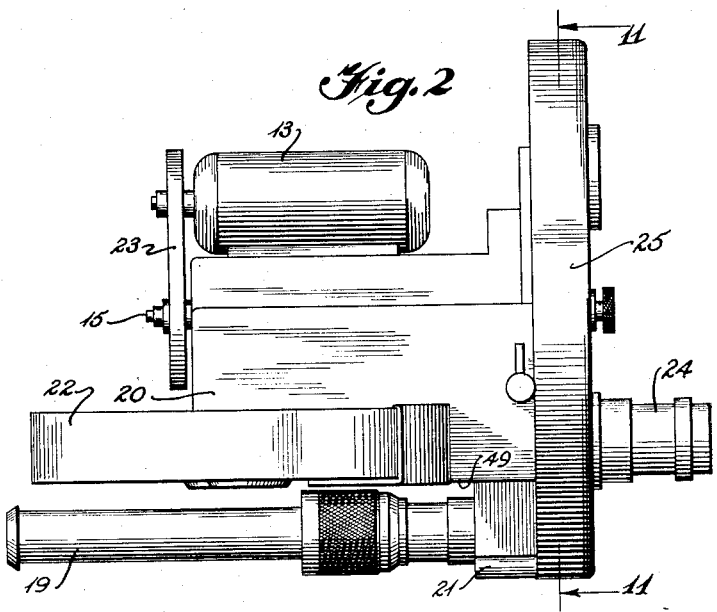
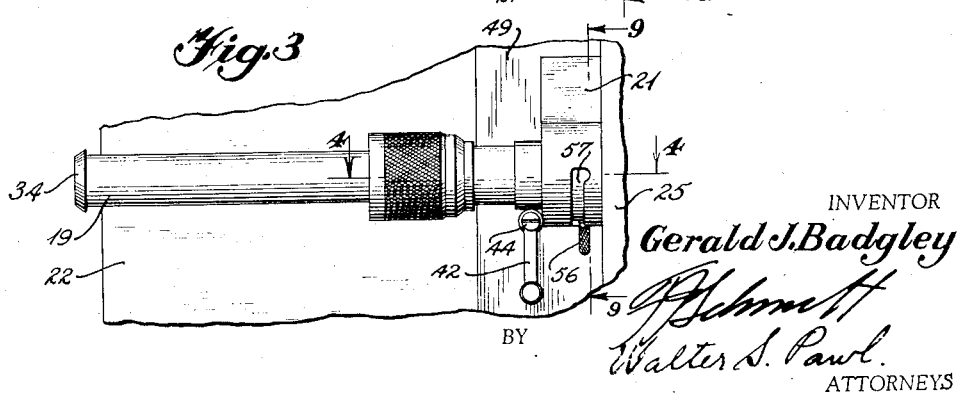
INVENTOR
Gerald J. Badgley
BY
ATTORNEYS March 31, 1959 G. J. BADGLEY 2,879,688
TELEVISION RECORDING CAMERA HAVING STABILIZED SHUTTER
Filed Dec. 30, 1953 4 Sheets-Sheet 2
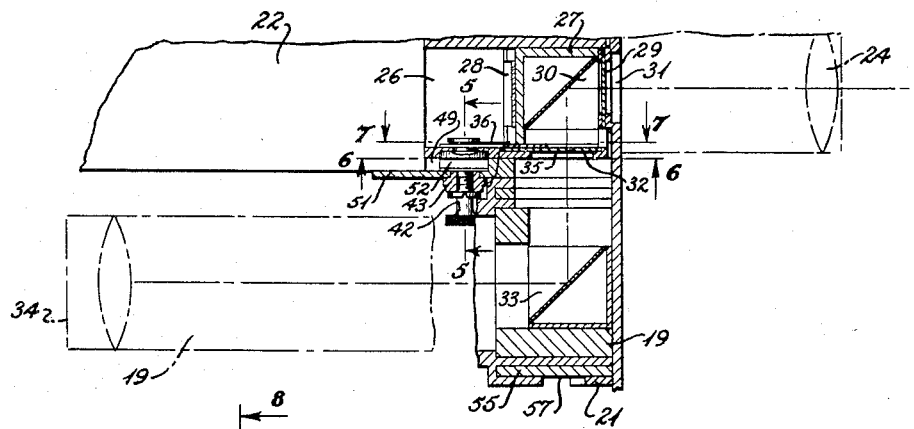
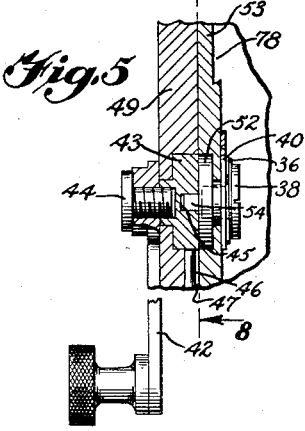
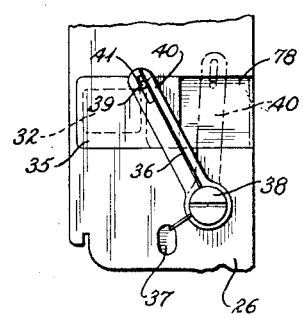
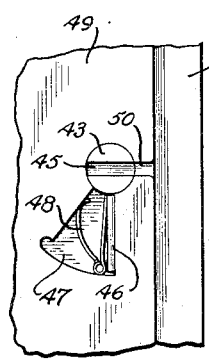
INVENTOR
Gerald J. Badgley
BY
ATTORNEYS

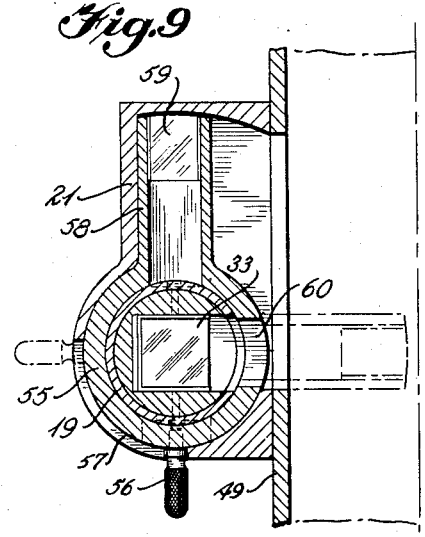
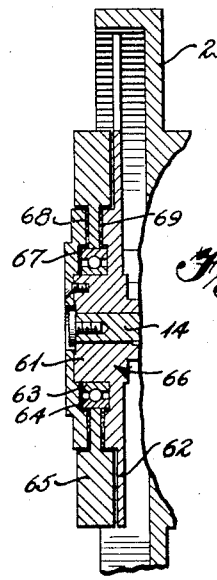
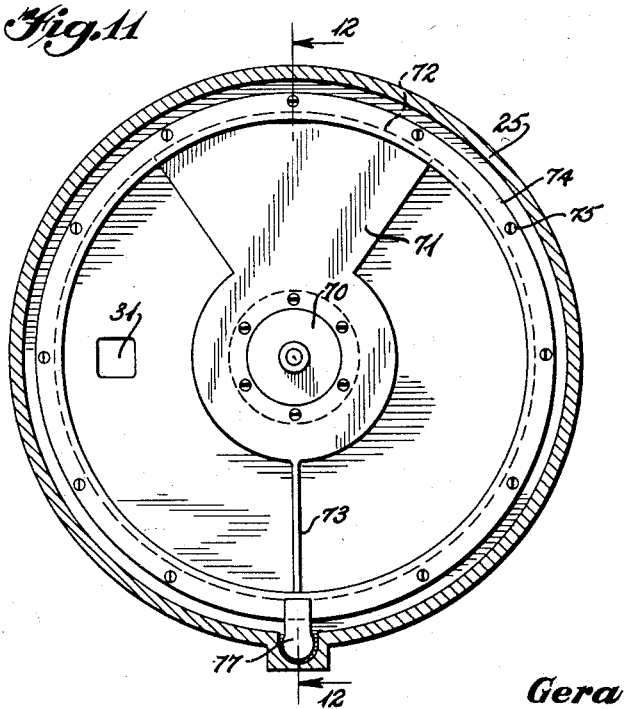
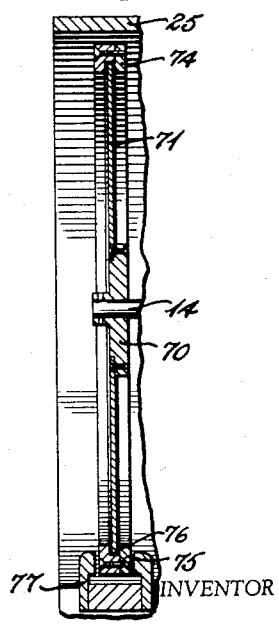

March 31, 1959     G. J. BADGLEY     2,879,688
TELEVISION RECORDING CAMERA HAVING STABILIZED SHUTTER
Filed Dec. 30, 1953     4 Sheets-Sheet 4

INVENTOR
GERALD J. BADGLEY
BY
ATTORNEY

United States Patent Office 2,879,688
Patented Mar. 31, 1959

2,879,688

TELEVISION RECORDING CAMERA HAVING STABILIZED SHUTTER

Gerald J. Badgley, District Heights, Md.

Application December 30, 1953, Serial No. 401,441

13 Claims. (Cl. 88—18)

(Granted under Title 35, U. S. Code (1952), sec. 266)

The invention described herein may be manufactured and used by or for the Government of the United States of America for governmental purposes without the payment of any royalties thereon or therefor.

This invention relates to an improvement in the type of cameras which are used for making a motion picture recording of images which appear on the picture tube of a television receiver.

Commercial television receivers operate at a frequency of 30 frames per second, each frame having two fields. On the other hand, standard film projection devices usually operate at a frequency of 24 frames per second. It is, therefore, desirable to record the television images which occur at a frequency of 30 frames per second at the standard film frequency of 24 frames per second. This can be accomplished by using the basic method and shutter set forth by David W. Epstein in United States Patent 2,251,786. In effect, the method set forth in the above mentioned patent eliminates 6 out of every 30 television frames by photographing 1 television frame (2 fields) of the received television image, omitting the next ½ field and then repeating the process. During the time in which the ½ field of the received television image is omitted, the camera shutter is closed and a new frame of film is positioned in the exposure aperture of the recording camera for repeating the photographing process. However, it can be seen that in the above mentioned process, where ½ of a television field is omitted periodically during the photographing process, that only the remainder of this ½ field is photographed. A successive half field is therefore optically spliced to the first half field in order to complete the photographing process to give a complete and uniform exposure on the frame of film then positioned in the exposure aperture of the camera. This procedure is fully explained in detail in U. S. Patent 2,251,786, noted above. However, it can be seen that when the above method is used, any variation in camera shutter speed from the theoretically proper speed will cause improper video splicing. This is characterized by a line appearing on the film. This line may be caused by overlapping of the fields which are optically spliced, or it may be caused by the non-meeting of these fields. Therefore, it is of great importance that the camera shutter speed be maintained as close as possible to the theoretically optimum speed in order that the best possible reproduction be obtained.

The present invention discloses a television recording camera which gives improved results when using the method disclosed in U. S. Patent 2,251,786. The instant invention discloses, as one feature thereof, a television camera which possesses a stabilized shutter. Prior art motion picture cameras which are used for kinerecording television images in the above described manner must use separate motors to drive the shutter mechanism and the film feeding mechanism in order to minimize the characteristic which appears in the photograph known as shutter banding. This shutter banding is the formation of a line in the photograph which is caused by improper video splicing, mentioned above, which is in turn caused by variations in speed of the shutter because of the intermittent nature of the pull down in the film feeding operation. However, the use of two motors has a number of disadvantages, namely, that intricate electrical coupling means must be employed between the two motors in order to synchronize the two motors. Furthermore, the use of a plurality of motors causes the apparatus to be heavy and cumbersome. The use of two motors also precludes the use of a multiple turret lens mounting. However, the instant apparatus discloses an arrangement whereby one drive motor is utilized to drive both the shutter and the film feeding means without the aforementioned disadvantages which were prevalent in the prior art. One motor can be used because the camera shutter is stabilized, in a sense to be more fully described hereafter, and because the film feeding mechanism is of the type which operates at a constant speed but intermittently engages the film as shown in my copending application, Serial No. 157,392, filed April 21, 1950, now abandoned. A stabilizer device is combined with the shutter of the television camera to assist the shutter in maintaining its proper optimum speed. In this way the tendency for the above mentioned optical splice line to be formed is minimized.

The present invention also discloses a synchronizer device which is operatively mounted between the drive means of the camera and the shutter of the camera. The function of the synchronizer is to cause relative rotary movement of the camera shutter with respect to the drive means which drives the camera shutter. By moving the shutter of the camera in this manner, while the camera is being used for photographing the image produced by a television receiver, exposure of the film which is positioned in the exposure aperture of the camera is caused to start at a different portion of the picture frame which appears on the television receiver. In this way the optical splicing will take place at the portion of the television frame where exposure of the photographic film starts. The above mentioned stabilizer tends to minimize the occurrence of a line at the point of video splicing. However, even if a small line remains, the synchronizer can be used to position this line, which might be formed during the optical splicing, in a noncritical portion of the picture produced on the film. It can be seen that this procedure enhances the quality of the finished reproduction in the sense that the line which may be formed is capable of being positioned on the film so as not to detract from the main feature in the picture.

In order to provide an arrangement whereby the foregoing can be accomplished, the instant invention provides a viewer by which the image which is being formed on the film can be observed during the photographing process. By this arrangement, the line formed by optical splicing during kinerecording of the television image may be observed as it is actually being positioned in different portions of the picture by the synchronizer. When this arrangement is being used for the above mentioned purpose, the film in the camera acts as a ground glass. However, because of the unique structure of the arrangement, which is explained more fully hereafter, fogging of the film is prevented. This arrangement can be used with any type of camera which possesses the necessary basic structure which is more fully explained infra. However, when this arrangement is used with a magazine loading camera of the type described in my copending application Serial No. 157,392 filed April 21, 1950, of which this application is a continuation-in-part, additional viewing structure is provided which is used in conjunction with the foregoing optical viewing arrangement for the purpose of aligning the camera with the object to be photographed and for focusing the camera when the magazine containing the film, which acts as a ground glass in the prior mode of operation, is not installed in the camera.

It is therefore one object of the instant invention to disclose an improved kinerecording camera for photographing television images which occur on the television receiver at a higher frequency than the exposure frequency at which the recording camera operates.

It is another object of the instant invention to disclose apparatus for stabilizing the shutter of the above described type of kinerecording camera whereby the tendency for the formation of optical splice lines in the photograph is minimized.

It is another object of the instant invention to disclose an optical viewing arrangement associated with the kinerecording camera whereby the image on the film may be observed during the actual photographing process. In this manner, the presence of an optical splice on the film may be readily detected. The focus of the picture and its exposure can also be observed.

It is still a further object of this invention to disclose a synchronizing device which is utilized in combination with the kinerecording camera. The synchronizer allows the camera operator to move the optical splice, which might be formed, to any desired portion of the photograph. The movement of the optical splice from one part of the photograph to another is observed during the actual photographing process and thus may be positioned in a non-critical portion of the picture.

It is still a further object of this invention to disclose an additional optical arrangement which is used in combination with the foregoing described optical viewing arrangement whereby the focus and exposure of the picture, and the positioning of an optical splice can be observed when there is no film in the camera.

Other objects and many of the attendant advantages of this invention will be readily appreciated as the same becomes better understood by reference to the following detailed description when considered in connection with the accompanying drawings wherein:

Fig. 1 is a schematic diagram which shows the television camera of this invention mounted in relation to a television receiver. This figure particularly points out the relationship of the synchronizer to the remainder of the camera.

Fig. 2 is a plan view of the camera which shows the viewing telescope mounted on the camera housing.

Fig. 3 is a partial side elevational view of the camera which shows the viewing telescope.

Fig. 4 is a sectional view taken on line 4—4 of Fig. 3 which shows the optical arrangement which allows the film in the camera to be viewed while it is being exposed.

Fig. 5 is a sectional view taken on line 5—5 of Fig. 4 which shows details of the gate and latch mechanism of the optical viewing arrangement.

Fig. 6 is a sectional view taken on line 6—6 of Fig. 4 which shows the construction of the outer side of the magazine nosepiece as it relates to the optical viewing arrangement.

Fig. 7 is an enlarged sectional view taken on line 7—7 of Fig. 4 which shows details of the gate latching structure on the inside surface of the magazine nosepiece.

Fig. 8 is a sectional view taken on line 8—8 of Fig. 5 which shows details of the latching structure which is positioned on the camera housing.

Fig. 9 is a sectional view taken on line 9—9 of Fig. 3 which shows an optical viewing arrangement which is used to set up the camera when no film is in the camera.

Fig. 10 is a sectional view showing one form of shutter stabilizer.

Fig. 11 is a view taken along line 11—11 of Fig. 2 which shows features of another species of the stabilized shutter.

Fig. 12 is a sectional view taken on line 12—12 of Fig. 11 which shows details of the shutter stabilizing structure.

Figure 14:
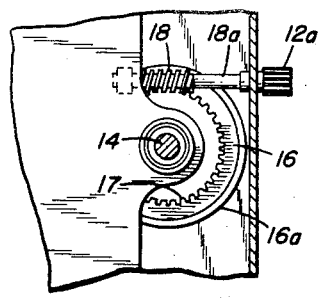
Fig. 14 is a sectional view taken on line 14—14 of Fig. 13 showing details of the synchronizing structure.
Figure 13:
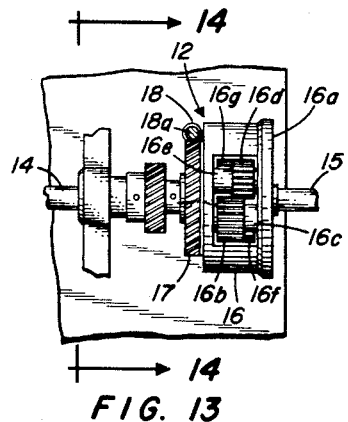
Fig. 13 is a side view of the synchronizing gears.
Figure 15:
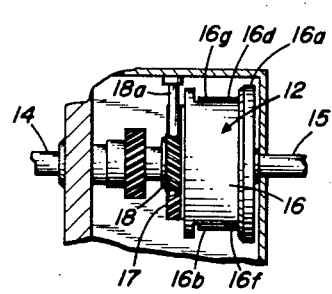
Fig. 15 is a plan view of the synchronizing means.

In Fig. 1 numeral 10 generally designates a camera which is properly positioned to produce a motion picture recording of the images which appear on the picture tube 11 of a television receiver. The number of frames of motion picture film produced per unit of time are different from the number of frames produced on the picture tube of the television receiver, as explained supra. Therefore, in changing from one frequency to the other, optical splicing is resorted to in order to produce the required number of frames on the motion picture film. This optical splicing often leaves a splice line in the film which might spoil the critical portion of the picture. It is therefore desirable to move this line to a non-critical portion of the film. This is accomplished by using synchronizer 12 which is interposed between the camera drive motor 13 and the camera shutter. The synchronizer is a device which will cause relative rotary movement between shaft 14, which leads from the synchronizer to the camera shutter, and shaft 15, which leads from the drive motor 13 to the synchronizer 12. By changing the relationship of shaft 14 with respect to shaft 15 while the recording operation is in progress, exposure of the film is caused to start at a different position in the television frame from that at which it was originally. In this manner, the optical splice can be positioned in different portions of the film frame. In the particular synchronizer embodiment 12, numeral 16 depicts a housing having gear 17 affixed thereto. Worm gear 18 is journalled in the camera housing and meshes with gear 17. The synchronizer 12, in this instance, is a differential in which a gear affixed to shaft 15 meshes with an idler gear mounted within housing 16, which in turn meshes with another idler gear mounted within housing 16, which in turn meshes with a gear affixed to the end of shaft 14. Particular attention is directed to Figs. 13, 14 and 15 in which the synchronizer 12 has a control 12a for adjusting the rotary position of the camera shutter with respect to the position of the drive shaft of motor 13, Fig. 1, and thereby bringing the shutter movement into a desired time coincidence with the reappearance of the images to be photographed on the screen of the television tube.

The synchronizer 12 may be of conventional design, and may comprise casing 16, cap or cover 16a, gear 16b and spacer 16c, gear 16d and spacer 16e, gear 16f, gear 16g, and gear 17 cooperating with worm 18 on shaft 18a, the rotary position of which is adjusted by aforementioned member 12a. The operation of the synchronizer is conventional and need not be described in detail. It is to be noted at this point that the camera herein disclosed is in all respects similar to the camera described in my copending application except for certain features which will be explained in detail hereafter.

Fig. 2 is a plan view of the camera which has mounted thereon telescope 19 which allows the viewing of the film in the camera while it is being exposed. The telescope 19 is affixed to camera housing 20 by means of the housing 21 which contains part of the optical structure by which the film may be viewed during exposure. Film magazine 22 has the same structure as and is adapted to be positioned on the camera housing in the same manner as explained in my above mentioned copending application. Drive motor 13 is affixed to housing 20 and is suitably coupled by means 23 to the camera drive shaft 15. The synchronizer is located within the camera housing 20, and is not shown. Lens 24 is operatively affixed to the shutter housing 25 which is in turn attached to camera housing 20. Not shown in the drawings is the film feed mechanism which positions successive frame of film relative to the exposure aperture of the camera. This film feed mechanism may be the same as disclosed in my above mentioned copending application.

Reference is now made to Fig. 4 which is a sectional view taken on line 4—4 of Fig. 3. Affixed to the front of magazine 22 and forming a part thereof is nosepiece 26 (also see Fig. 6). By way of explanation, the film is passed out of magazine 22, through the front end of the nosepiece 26 and then back into the magazine 22 as explained in my above referred to copending application. It is to be noted, however, that the viewing arrangement which will subsequently be described is not limited to the type of camera magazine which is set forth in my copending application but may be incorporated into any conventional magazine or camera where applicable. Mounted within nosepiece 26, Fig. 4, is film pressure plate supporting member 27, which is biased for sliding movement to the right in Fig. 4 by spring 28, which is in turn affixed to the inside of nosepiece 26. Pressure plate member 27 tends to cause film 29, which passes between member 27 and a frame (not numbered) on the face of the nosepiece 26 to lie flat. Member 27 has fixedly mounted therein optical prism 30. This prism is positioned with respect to the exposure aperture 31, Figs. 4 and 11, in such a manner that the film 29 passes between exposure aperture 31 and prism 30 as shown in Fig. 4. Thus, when a film is being used which is translucent, light passes through lens 24, exposure aperture 31, film 29, and is refracted by prism 30. It is noted at this point that a prism has been shown, but a properly positioned mirror would serve equally well to cause the light rays to take the path shown in the drawings. The light after being refracted by prism 30 passes through viewing aperture 32, Figs. 4 and 6, when the latter is open, is refracted by prism 33, which is mounted in telescope 19 and then passes to the eyepiece of telescope 19. When the photographer's eye is against the viewing end 34 of telescope 19, light cannot enter the telescope to fog the film.

The viewing aperture 32, in magazine nosepiece 26, is normally closed by gate 35, Figs. 4 and 7. Spring 36, Figs. 4, 5, and 7, has one end anchored at 37 in the side of nosepiece 26, winds around the shaft 38, which is journalled in the side of nosepiece 26, and exerts its spring pressure against pin 39 which is affixed to gate 35. By this construction, gate 35 is normally biased to a closed position. Arm 40 is keyed, at one end thereof, to shaft 38 and has slot 41 formed in the other end thereof, said slot mating with pin 39. It can thus be seen that because of this construction, the turning of shaft 38 in a clockwise direction, Fig. 7, causes arm 40 to move to the dotted position and thereby causes gate 35 to uncover aperture 32. Gate 35 rides in dovetail groove 78, Figs. 7 and 5, which is formed on the inside portion of side 53 of nosepiece 26. It can readily be seen that when the camera is in operation that gate 35 must be closed at all times that the photographer's eye is not against the end 34 of telescope 19 in order to prevent light from passing through the prisms and thereby fogging of the film.

The latching mechanism for actuating arm 40 will now be described. Lever arm 42, Figs. 3 and 5, is joined to plug 43 by bolt 44. Pivotal movement of arm 42 causes a corresponding pivotal movement of the plug 43. Plug 43 is journalled in a complementary recess in the side 49 of housing 20, see Figs. 2, 3 and 5. The inner surface of plug 43 is slotted as at 45, Fig. 8. Pin 46 is affixed to plug 43 and rides in recess 47 which is formed on the inner surface of the housing 49. Spring 48 biases pin 46 against the right hand wall (not numbered) of recess 47, Fig. 8. This right hand wall in cooperation with pin 46 serves the function of causing slot 45 in plug 43 to align itself with slot 50 which is formed in the housing 49. Portion 51 of housing wall 49 is cut away so that it lies in approximately the same plane with the bottom of slots 45 and 50.

Plug 52 is journalled in the side 53 of nosepiece 26, Fig. 6, and is held in a mating recess (not numbered) by shaft 38 which also serves as a bolt, Fig. 5. Plug 52 has a key 54 formed thereon. When gate 35 is biased to a closed position, Fig. 7, the key 54 on plug 52 is in a horizontal position. Thus it can be seen that when both plug 43, mounted in the camera housing 49, and plug 52, mounted in the side 53 of magazine nosepiece 26, are in their normal spring biased positions that both the slot 45 and the key 54 are in a horizontal position, Figs. 6 and 8.

The magazine 22 with its attached nosepiece 26 is adapted to be slid into position on the camera housing 20. This procedure is fully described in my copending application Serial No. 157,392, filed April 21, 1950. However, for purposes of this invention it is only necessary to explain that when the magazine is inserted into the camera housing it travels a path parallel to the horizontal axis of the camera, that is, from left to right in Figs. 2 and 3. The positioning of key 54 and slot 45 relative to each other is such that as the magazine and nosepiece are slid into position on the camera housing, from right to left in Fig. 8, key 54 will pass through slot 50 and seat itself in slot 45 of plug 43. Key 54 is smaller in size than slot 45 and fits within the circumference of plug 43. The fully seated position is shown in Fig. 5. In operation, after the aforedescribed engagement has been completed, the moving of lever 42 in the direction of the arrow, Fig. 3, will cause plug 43 to be pivoted in a clockwise direction, when viewed from Fig. 8. This causes plug 52, which is now engaged with plug 43 by means of tongue and groove connection 54—45, Fig. 5, to pivot in a counter-clockwise direction when viewed from Fig. 6. This pivotal movement of plug 52 causes lever arm 40 to move from its solid line position to its dotted line position in Fig. 7 thereby causing gate 35 to slide in groove 78 and uncover viewing aperture 32. In order to keep viewing aperture 32 uncovered, lever 42 must at all times be held in its proper position. When lever 42 is released, the spring pressures of spring 48 and of spring 36 cause lever arm 42 and gate 35, respectively, to return to the position corresponding to that at which gate 35 covers viewing aperture 32. It is to be further noted that in this position of lever 42, slot 45 and key 54 are in a horizontal position so that the magazine may be removed from the housing without jamming the latch mechanism.

Reference is now made to Fig. 9 which discloses an additional viewing arrangement which is used for setting up the camera in such a manner that the photographer can see the field of view which will be recorded on the film. This arrangement is used when the magazine which contains the film is not inserted in the camera housing. Fig. 9 is a sectional view taken on line 9—9 of Fig. 3 and shows the inside of the telescope housing 21. Telescope 19 is fixedly mounted within housing 21 by suitable connections, not shown. Pivotally mounted about telescope 19 within the housing 21 is sleeve 55 which has affixed thereto handle 56 which rides in slot 57, Figs. 3 and 9. Sleeve 55 has hollow arm 58 affixed thereto which has mounted in its outer end prism 59. When handle 56 is moved in slot 57 from its solid line position to its dotted line position, arm 58 and prism 59 move a corresponding amount from the solid line position to the dotted line position, Fig. 9. When prism 59 is in its dotted line position it is directly behind the exposure aperture of the camera. The face of prism 59 is ground so that an image will be formed thereon. It will be noted that when prism 59 is positioned behind the exposure aperture of the camera, the light travels in the same manner as shown in Fig. 4, the prism 59 being positioned in the same place as was prism 30 when the magazine 22 was inserted in the camera. It will be further noted that the aforedescribed latching mechanism is not required in this aspect of the invention. Sleeve 55 has an aperture 60 therein which is in the solid line position shown in Fig. 9 when arm 58 is in its solid line position. This aperture allows prism 30 to cooperate with prism 33 when the magazine is mounted in the camera, as shown in Fig. 4. When the magazine is to be inserted into the camera, arm 58 must be in its solid line position in order to allow magazine 22 to seat properly in the camera. Thus it can be seen that a viewing arrangement is provided which allows a photographer to see the field of view which will be shown on the film after it is inserted into the camera. Furthermore since the image can be seen because of the ground face of the prism, the camera can be focused and the proper lens opening can be set into the camera.

The shutter stabilizer aspect of this invention will now be described, attention being directed to Figs. 10, 11, and 12. One species of shutter stabilizer, which is drawn in cross section, is shown in Fig. 10. Hub portion 61 of camera shutter 66 is fixedly attached to shaft 14 of the camera, and shutter portion 62 extends radially from hub 61. Fixedly mounted on the outside of hub 61 is the inner race 63 of a ball bearing. The outer race 64 has fixedly mounted thereon a weighted rim member 65. Fixedly mounted to the hub portion 61 of shutter 66 is cover plate 67. It can be seen from the foregoing construction that shaft 14, shutter 66, and cover plate 67 rotate as a unit whereas outer rim 65 is capable of relative rotation with respect to these members. Interposed between the shutter 66 and its affixed members, and the rim 65 are the felt liners 68 and 69. These liners tend to damp any relative movement between rim 65 and shutter 66. As can be seen from Fig. 10, the only contact between the innermost portion of stabilizer rim 65 and shutter 66 is through felt pads 68 and 69 and the ball bearing. Shutter 66 and cover plate 67 do not contact the outer race 64 of the ball bearing, nor any other portion of the stabilizer except through felt pads 68 and 69. Further details of this species of the stabilizer are set forth in my copending application Serial No. 157,392 filed April 21, 1950, the foregoing details being sufficient for this disclosure.

The purpose of stabilizer 65 is to provide constant speed shutter rotation regardless of change in load conditions imposed on the main power source of the apparatus because of the intermittent nature of the film feeding operation and other factors which throw a load on the drive means. It can be seen that when shaft 14 is rotating at operating speed, stabilizer 65 acts to give the shutter a higher moment of inertia to allow the shutter rotation to remain uniform regardless of changes in load conditions. For example, if shaft 14 tends to speed up, stabilizer 65 will tend to resist this change; and if shaft 14 tends to slow down, the stabilizer will resist this change. Furthermore, when the shaft 14 is initially started from rest shutter member 66 can move relative to stabilizer 65 because of the loose connection between them, namely, the felt washers 68 and 69, and the ball bearing. Thus in the starting of the camera the load of the stabilizer is not thrown on the motor since the shutter will move relative to the stabilizer. The stabilizer is gradually caused to rotate because of the felt washer connection between it and the shutter generates enough friction to bring the stabilizer up to speed gradually. The stabilizer provides the advantages to the shutter mechanism of providing it with high inertia means for smooth operation after the motion picture camera has attained full speed. On the other hand, the stabilizer does not unduly load the drive means and thereby prevent the shutter from coming up to full speed as soon as possible.

In the species of the shutter stabilizer shown in Figs. 11 and 12, central hub portion 70 has intermediate shutter portion 71 affixed thereto. Surrounding the portions 70 and 71 and concentric with the center of central hub portion 70 is a ring member 72 which is affixed to shutter portion 71. In order to lend stability to the shutter structure, supporting rib 73 also links the central hub portion 70 with the outer ring portion 72. As the shutter rotates it periodically covers and uncovers the exposure aperture 31 at which successive frames of film are positioned for exposure.

Slidably mounted on ring 72 is outer rim member 74 which may consist of two halves, Fig. 12, suitably joined as by screws 75. Interposed between the inside of outer rim 74 and the outside of ring 72 is a felt liner 76 Fig. 12, which serves the same function as the above discussed felt liners 68 and 69. The general principle of operation of this stabilized shutter, up to this point, is the same as discussed in connection with Fig. 10.

A further refinement of this species of stabilized shutter consists of magnet 77 mounted on the shutter housing 25. In this species the outer rim 74 is metallic, preferably brass. This outer rim is positioned for rotation between the poles of magnet 77. Current is generated in the rim 74 at right angles to the field of the magnet 77 as the rim rotates between the poles of the magnet. The amount of current generated represents a load on the shutter which is directly proportional to the speed of rim 74. The tendency is for this load to balance itself against the motive force driving the rim. In effect, therefore, this construction acts as a variable brake which tends to resist both increases and decreases in speed, thereby tending to maintain the speed of the shutter constant.

Obviously many modifications and variations of the present invention are possible in the light of the above teachings. It is to be therefore understood that within the scope of the appended claims the invention may be practiced otherwise than as specifically described.

Having thus described my invention, I claim.

1. A stabilized shutter for a camera comprising a disk having a central hub portion adapted to be mounted on a rotatable shaft, an outer ring portion, an intermediate shutter portion affixed between said central hub portion and said outer ring portion, a rim member movably mounted on said outer ring portion for relative rotation thereto, and damping means operatively position relative to said outer ring portion and said rim member for damping the relative movement therebetween.

2. A stabilized shutter as set forth in claim 1 wherein said damping means comprises a lining interposed between said rim member and said outer ring portion.

3. A stabilizer shutter as set forth in claim 2 wherein said stabilizer rim member is metallic and a magnet is adapted to be mounted proximate to said rim member whereby eddy currents induced in said rim member tend to prevent changes in the rotational velocity of said shutter means.

4. A stabilized shutter as set forth in claim 3 wherein there is further provided a lining interposed between said rim member and said outer ring portion.

5. A kinerecording camera for recording television pictures at a different frame frequency from the frame frequency at which the television pictures appear on a television receiver wherein certain of the film frames are optically spliced comprising a housing, lens means mounted on said housing, shutter means mounted on said housing in operative relationship to said lens means, drive means coupled to said shutter means for driving said shutter means, film feeding means mounted on said housing and driven by said drive means for feeding the film, said shutter means comprising a disc having a central portion, an outer ring portion, and an intermediate shutter portion affixed between said central portion and said outer ring portion, stabilizer means on said shutter comprising a rim member movably mounted on said outer ring portion for relative rotation thereto, damping means operatively positioned relative to said outer ring portion and said rim member for damping the relative movement therebetween, and synchronizing means comprising gears operatively interposed between said drive means and said shutter means for altering the angular relationship between said drive means and said shutter means, whereby the optical splice formed during the recording process may be positioned at various positions in the film frame, and whereby said shutter will rotate at substantially constant speed even upon actuation of the synchronizing means.

6. A kinerecording camera as set forth in claim 5 wherein said damping means comprises a lining interposed between said rim member and said outer ring portion.

7. A kinerecording camera as set forth in claim 5 wherein said stabilizer rim member is metallic and magnet is mounted on said housing proximate to said rim member whereby the speed of rotation of said shutter is maintained substantially constant.

8. A kinerecording camera comprising a housing, lens means mounted on said housing, shutter means mounted on said housing in operative relationship to said lens means, drive means coupled to said shutter means for driving said shutter means, film feeding means mounted on said housing and driven by said drive means for feeding the film, said shutter means comprising a disc having a central portion, an outer ring portion, and an intermediate shutter portion affixed between said central portion and said outer ring portion, stabilizer means on said shutter comprising a rim member movably mounted on said outer ring portion for relative rotation thereto, damping means operatively positioned relative to said outer ring portion and said rim member for damping the relative movement therebetween, said damping means comprising a felt lining interposed between said rim member and said outer ring portion.

9. A kinerecording camera comprising a housing, lens means mounted on said housing, shutter means mounted on said housing in operative relationship to said lens means, drive means coupled to said shutter means for driving said shutter means, film feeding means mounted on said housing and driven by said drive means for feeding the film, said shutter means comprising a disc having a central portion, an outer ring portion, and an intermediate shutter portion affixed between said central portion and said outer ring portion, stabilizer means on said shutter comprising a metallic rim member and a magnet mounted on said housing proximate to said rim member, whereby eddy currents induced in said rim member tend to prevent changes in the rotational velocity of said shutter means.

10. A kinerecording camera comprising a housing, lens means mounted on said housing, a drive shaft journalled in said housing, shutter means affixed to said drive shaft and in operative relationship to said lens means, film feeding means mounted on said housing and operatively connected with said drive shaft, said shutter means comprising a disc having a central portion, an outer ring portion, and an intermediate shutter portion affixed between said central portion and said outer ring portion, stabilizer means on said shutter comprising a rim member movably mounted on said outer ring portion for relative rotation thereto, and damping means operatively positioned relative to said outer ring portion and said rim member for damping the relative movement therebetween.

11. A kinerecording camera as set forth in claim 10 wherein said damping means comprises a lining interposed between said rim member and said outer ring portion.

12. A kinerecording camera as set forth in claim 10 wherein said stabilizer rim member is metallic and a magnet is mounted on said housing proximate to said rim member whereby eddy currents induced in said rim member tend to prevent changes in the rotational velocity of said shutter means.

13. A kinerecording camera as set forth in claim 10 wherein said stabilizer rim member is metallic and a magnet is mounted on said housing proximate to said rim member whereby eddy currents induced in said rim member tend to prevent changes in the rotational velocity of said shutter means, and wherein there is further provided a lining interposed between said rim member and said outer ring portion.

References Cited in the file of this patent

UNITED STATES PATENTS

| | | |
|---|---|---|
| 1,377,322 | Tartas et al. | May 10, 1921 |
| 2,052,960 | Berggren | Sept. 1, 1936 |
| 2,149,217 | Heinisch et al. | Feb. 28, 1939 |
| 2,218,763 | Mery | Oct. 22, 1940 |
| 2,239,788 | Kerrins | Apr. 29, 1941 |
| 2,312,308 | Boecking | Mar. 2, 1943 |
| 2,503,325 | Coutant et al. | Apr. 11, 1950 |
| 2,529,896 | Askren | Nov. 14, 1950 |
| 2,613,264 | Haynes | Oct. 7, 1952 |
| 2,661,652 | Evans | Dec. 8, 1953 |
| 2,677,012 | Bach | Apr. 27, 1954 |

FOREIGN PATENTS

| | | |
|---|---|---|
| 388,296 | Great Britain | Feb. 23, 1933 |

OTHER REFERENCES

"Annales Des Telecommunications," article by Delbord, vol. 4, No. 6, 1949, pages 190–201. (Pages 191–196 especially cited.)